United States Patent [19]
Reddy

[11] 3,725,678
[45] Apr. 3, 1973

[54] CIRCUIT FOR PROVIDING MULTIPLE LEVEL OUTPUT VOLTAGE SIGNAL IN RESPONSE TO A REMOTELY SENSED VOLTAGE VARIATION AND HAVING AUTOMATIC LEVEL SWITCHING FEEDBACK

[75] Inventor: Junuthula N. Reddy, Horseheads, N.Y.
[73] Assignee: The Bendix Corporation, Southfield, Mich.
[22] Filed: May 7, 1971
[21] Appl. No.: 141,182

Related U.S. Application Data

[63] Continuation of Ser. No. 130,349, April 1, 1971.

[52] U.S. Cl. ................. 307/264, 307/296, 330/29
[51] Int. Cl. ........................................... H03k 1/14
[58] Field of Search...... 307/228, 237, 264, 235, 296; 330/29

[56] References Cited

UNITED STATES PATENTS

| | | | |
|---|---|---|---|
| 3,491,306 | 1/1970 | Nielsen | 330/29 |
| 3,436,563 | 4/1969 | Regitz | 307/228 X |

*Primary Examiner*—John Zazworsky
*Attorney*—Robert A. Benziger and Plante, Hartz, Smith and Thompson

[57] ABSTRACT

The circuit of the present invention is operative to produce an output signal having a plurality of signal levels and which automatically switches therebetween in response to a remotely sensed voltage signal. The circuitry of the present invention includes a current source operative to provide a known quantity of current which is passed through a resistive means to establish the output voltage signal. A current sink is provided in parallel with the resistive network and is selectively operative or inoperative to vary the amount of current flowing from the current source through the resistive network. Means are provided to sense the remote voltage and to control the current sink in response to the sensed voltage. The sensed voltage is also applied to the resistive network through a unidirectional current flow device to establish within the resistive network a voltage which corresponds to the sensed voltage whereby a decrease in the sensed voltage will automatically produce a corresponding decrease in the voltage output signal.

4 Claims, 3 Drawing Figures

JUNUTHULA N. REDDY
INVENTOR.

BY Robert A. Benziger
ATTORNEY

CIRCUIT FOR PROVIDING MULTIPLE LEVEL OUTPUT VOLTAGE SIGNAL IN RESPONSE TO A REMOTELY SENSED VOLTAGE VARIATION AND HAVING AUTOMATIC LEVEL SWITCHING FEEDBACK

CROSS-REFERENCE TO RELATED APPLICATION

The present case is a continuation of copending application Ser. No. 130,349, filed Apr. 1, 1971, "Control Means for Controlling the Energy Provided to the Injector Valves of an Electronically Controlled Fuel System" of which I am the sole inventor.

BACKGROUND OF THE INVENTION

1. Field of the Invention

The present invention is related to the field of voltage signal generating devices and is more particularly related to voltage signal generating devices which switch output signals between a plurality of voltage levels in response to variations in a remotely sensed control voltage.

2. Description of the Prior Art

The prior art teaches many mechanisms by which a voltage output signal may be automatically switched between a plurality of levels. However, the generation of a voltage signal which may automatically switch between a high level and a low level in a simple, straightforward, economical, and reliable fashion is not known. In controlling the energization of a plurality of electromagnetic coils, it is frequently desired to apply a high level of voltage and current to the coils to initiate the energization, but once energized, a relatively low level of current and voltage may be applied to maintain the energized level. In attempting to implement a control system for controlling the provision of current to such electromagnetic coils, I have discovered a simple straightforward and reliable method for generating a voltage signal which will switch from a relatively high level to a relatively lower level automatically upon sensing a similar decrease in a remotely generated voltage signal. Thus, I may generate a reference voltage which may automatically switch from a higher value to a lower value upon sensing the decrease in a remote voltage and which switching of reference signal will occur reliably.

Typically, the prior art devices may provide a plurality of parallel voltage generating means, one of which is mutually exclusively operative to generate the desired signal. The parallel generators are controlled in response to the sensed voltage so that the proper generator, and only the proper generator, is operative. This system is error-free only with expensive interconnecting controls and also suffers from switching transients. It is an object of the present invention to provide a signal generator capable of switching between at least two levels of output signal in response to a remotely sensed voltage. It is a further object of the present invention to provide a voltage signal generating system which will reliably switch from a first level of output signal to a lower level of output signal upon a decrease in a remotely sensed voltage without transients and will so switch even in the event of a partial system failure.

SUMMARY OF THE PRESENT INVENTION

The present invention is characterized by a circuit which comprises a current source generating a known level of output current which is then passed through a resistive network comprising at least two series coupled resistors. The resistive network is then parallelled with a current sink which is regulated to draw variable amounts of the current generated by the constant current source so as to vary the amount of current passing through the resistive network. A voltage signal may therefore be derived from the resistive network as a function of the voltage drop across the network and by controlling the series connected current sink the output voltage signal may be varied. In addition, the invention is further characterized by providing a uni-directional current flow connection between a portion of the resistive network and the remotely sensed voltage with at least one resistance interposed between the output voltage point and the feedback coupled voltage connection so that the output voltage signal will be comprised of components representative of (1) the sensed voltage, and (2) the current flowing through the resistive network. The invention is further characterized by providing a second, variable, current source which is operatively coupled to the current sink control electrode to regulate the current sink and the output of the variable current source is controlled by an electronic amplifier which receives as input signal the feedback coupled remotely sensed voltage.

DETAILED DESCRIPTION OF THE PREFERRED EMBODIMENT

Figure 1:
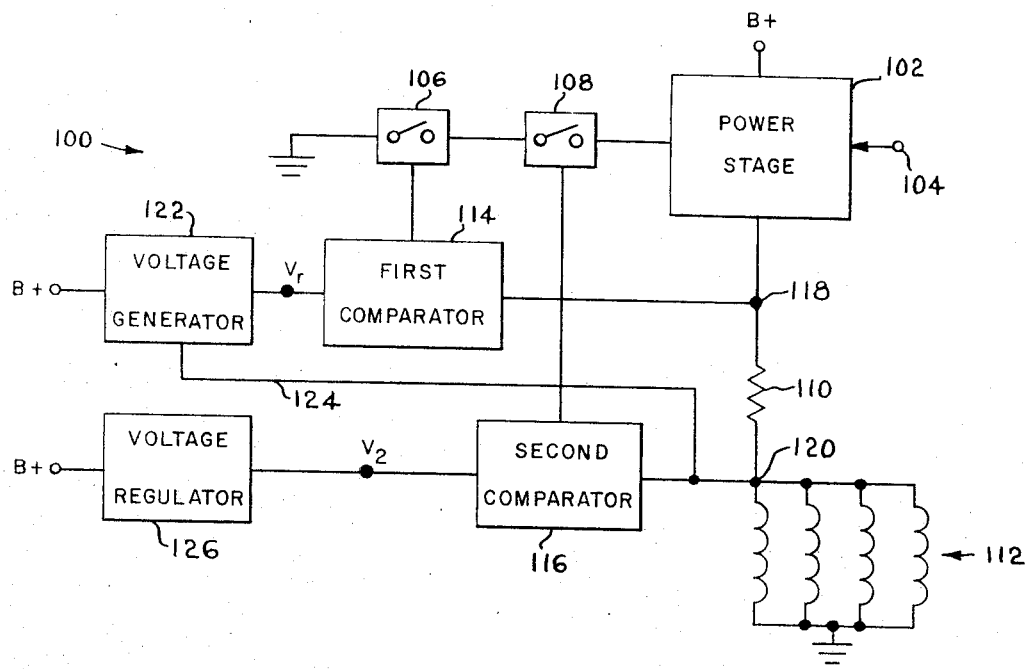
FIG. 1 shows a block diagram electromagnetic coil control circuit including the voltage signal generator according to the present invention.

Referring now to FIG. 1, a circuit 100 which utilizes the present invention is illustrated in a block diagram which illustrates the major components of a circuit which utilizes the present invention and which further illustrates their functional interrelationship and effect. The block diagram illustrates a power amplifier stage 102 which receives a signal from circuit port 104 which signal is a voltage pulse having a duration representative of a control variable to operate as an input parameter. Power stage 102 also receives the B+ voltage as illustrated and communicates this voltage to ground through the first and second variable valve-type switches denoted as 106 and 108, respectively. Switches 106 and 108 are placed in series relationship so that their effect on the circuit 100 is cumulative. The power stage 102 is operative to provide energizing current through resistor 110 to the various electromagnetic coils denoted as 112. The block diagram of the circuit 100 further includes a first comparator 114 and a second comparator 116. The first comparator 114 is operative to examine the voltage on the power stage side of resistor 110 (at circuit location 118), while the second comparator 116 is operative to examine the voltage as applied to the various electromagnetic coils 112 (at circuit location 120).

Figure 2:
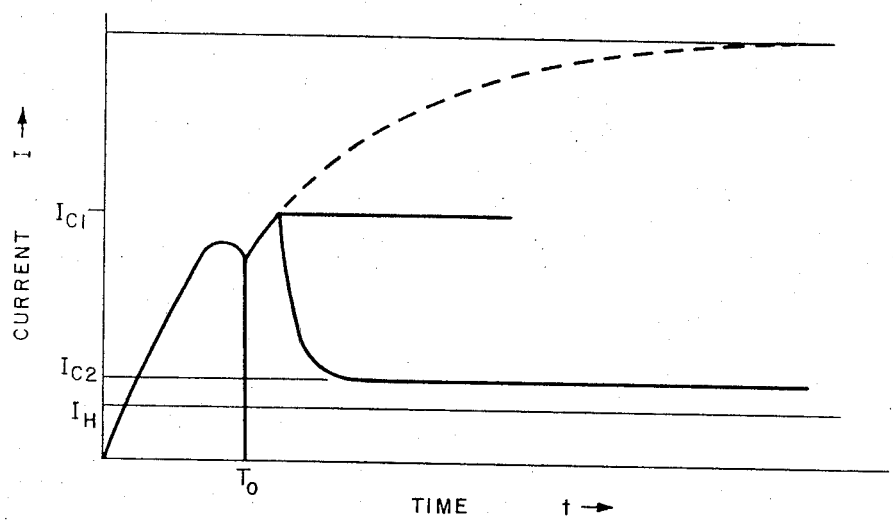
FIG. 2 shows a graph representative of current flow through the electromagnetic coil with selected signal levels denoted.

The second comparator 116 is connected to the second switch 108. Second comparator 116 receives a reference voltage denoted as $V_2$ and is operative to compare the voltage at circuit location 120 with reference voltage $V_2$ in order to control variable valve-type switch 108 so that the voltage at circuit location 120 is maintained at the reference ($V_2$) level. By way of example, in the application of the circuit 100 to control the electromagnetic coils in an automotive fuel injection system, it has been determined that setting reference $V_2$ at 9.5 volts will guarantee that the voltage received at circuit location 120 will not be less than the reference voltage regardless of variations in the B+ value, except in those instances where switch 106 is dominating. Thus, second comparator 116 is operative to control the initial current flow phase of the energization of the electromagnetic coils 112. With reference to FIG. 2, this is during the time period prior to $T_o$ and thereafter until the current level reaches $I_{cl}$.

First comparator 114 is coupled to first switch 106 and receives a reference voltage denoted as $V_r$ to which the voltage at circuit location 118 is to be compared. First comparator 114 is operative to control switch 106 so that the voltage appearing at circuit location 118 is approximately equal to the instantaneous value of $V_r$. However, in those instances where switch 108 is dominating, the voltage at circuit location 118 may be somewhat less than the established reference.

Switches 106 and 108 have been described as variable valve-type switches and this term is intended to mean that the amount of electrical energy which passes through them may be controlled so that greater, or lesser, amounts of energy from supply B+ are passed through the power stage 102 through switches 106 and 108 to ground as noted. First comparator 114 and second comparator 116 are, therefore, operative to regulate switches 106 and 108 so that greater or lesser amounts of energy are allowed to flow through power stage 102 and the electromagnetic coils 112. In this regulation, the first and second comparators will attempt to cause switches 106 and 108 to open or close by varying degrees.

As is understood, a switch in the closed condition will pass energy and in a switch in the open condition will not pass energy. For certain phases of operation of my invention, one or the other of the comparators will be commanding its associated switch to be closed more completely (i.e., pass more energy) because the voltage received by the comparator from circuit location 118 or 120, as the case may be, will be significantly below the applied reference voltage. In those instances, the comparator and the associated switch will, in fact, not affect the supply of energy to the electromagnetic coils 112 due to the fact that a switch can only be closed to a maximum amount beyond which further efforts to close the switch will be without effect.

The reference voltage applied to the first comparator 114 is generated by the voltage generator 122 of the present invention. Voltage generator 122 receives the B+ input voltage as noted and also receives, as a feedback signal, a signal representative of the voltage existing at circuit location 120. Voltage generator 122 is adjusted to establish an output voltage $V_r$ having a first value during the initial operation of the circuit 100 and a second, lower, value during subsequent operation. During the initial period, very little current will be flowing through the electromagnetic coils 112 and the voltage at circuit location 120 will be readily regulated to the established $V_2$ reference level. However, as more and more current begins to flow, the voltage at circuit location 118 will reach the first reference value $V_r$. Current flow will then be limited to the value then existing. Hence, due to the absence of any further rate of change of current level, the voltage at circuit location 120 will drop and this drop will be observed by voltage generator means 122 by way of feedback path 124 which terminates at circuit location 120. Upon the occurrence of the voltage drop at circuit location 120, the output, $V_r$, of voltage generator 122, will drop toward the second value and first comparator 114 will observe that the voltage then appearing at circuit location 118 is in excess of the then-established reference voltage $V_r$. First comparator 114 will suitably regulate first switch 106 to reduce the energy flowing from the power stage 102 to the electromagnetic coils 112 so that the voltage at circuit location 118 will drop to the new, or second, $V_r$ reference level. The decrease in voltage at circuit location 118 will cause a further decrease in the voltage at circuit location 120 but since switch 106 will be dominating, the resultant attempted further closure of switch 108 will be without effect on the voltages at circuit locations 118 and 120.

The reference voltage $V_2$ is established by voltage regulator 126. Voltage regulator 126 is adapted to provide a fixed level reference voltage to the second comparator 116.

In an operating cycle of the block diagram of FIG. 1, the initial application of power through circuit locations 118 and 120 by receipt of a suitable control pulse from other circuitry not disclosed herein through circuit port 104, will be under the inductor transient conditions in which the electromagnetic coils 112 will present a very high resistance to energy flow. The second comparator, in attempting to regulate the voltage at circuit location 120 will substantially close switch 108 to the point that the voltage being applied at this point in time from the power stage 102 to the electromagnetic coils 112 is at a near maximum regulated value. Additionally, first comparator 114 will also have closed switch 106 so that switches 106 and 108 represent a minimum impedance circuit between the power stage 102 and ground. As current begins to flow through circuit locations 118 and 120 and the electromagnetic coils 112, the voltage being received by the second comparator from circuit location 120 will be regulated to the $V_2$ reference level. As the impedance of the electromagnetic coils 112 decreases, the voltage at circuit location 120 will drop and switch 108 will be further closed by second comparator 116. As the current flowing through the electromagnetic coils 112 begins to increase and switch 108 tries to maintain the $V_2$ reference level at circuit location 120 the voltage being received by the first comparator from the circuit location 118 will also show an increase which will be a function of the voltage at circuit location 120 (the established reference value) plus the amount of current flowing through resistor 110 multiplied by its resistance. The purpose of resistor 110 is merely to provide a measurement source for the current flowing through the electromagnetic coils 112 and as a result thereof, the resistive value of resistor 110 may be made very small (i.e., from about one-tenth of an ohm to about two-tenths of an ohm). According to the prior art, resistors which were placed in series with the electromagnetic coils of, for instance, the injector valves of a fuel injection system had to be substantially higher in magnitude in order to dissipate the power generated by the high current flow under the steady state condition of current flow when the impedance of the electromagnetic coils 112 was very low. For example, the resistive value of such a resistor according to the prior art, in an otherwise similar system, would be on the order of 5 or 6 ohms. As the voltage at circuit location 118 begins to increase, indicative of higher and higher current flows, the voltage at circuit location 118 will begin to approach the reference value $V_r$ at which point in time the first comparator 114 will begin to open switch 106.

As switch 106 begins to open, the amount of energy being provided through the power stage 102 to the electromagnetic coils 112 will begin to decrease. This decrease will have the effect of decreasing the voltage present at circuit location 120, as well as decreasing the voltage growth due to current flow at circuit location 118, and the second comparator 116 will, at this point in time, reclose switch 108. This closure will have no effect on the overall power being provided through the power stage 102 to the electromagnetic coils 112 due to the series relationship of switches 106 and 108. However, as the voltage at circuit location 120 begins to drop, voltage generator 122 will detect this fact and will consequently reduce the value of the output voltage $V_r$ to a second predeterminable amount. This reduction in reference voltage $V_r$ will cause the first comparator 114, recognizing that the voltage at circuit location 118 is now substantially in excess of this value, to open switch 106 thereby further decreasing the amount of energy being provided by the power stage 102 to the electromagnetic coils 112. By suitably selecting the lower value to which the output voltage signal, $V_r$, is switched by the voltage generator 122, the amount of current flowing through electromagnetic coils 112 in the steady state condition can be established at a value which is just slightly in excess of the amount of current required for steady state operation.

By limiting the maximum voltage applied directly to the electromagnetic coils 112, the need for the expensive, complicated, and error-introducing voltage correction schemes taught to be necessary by the prior art in instances where precise energization is necessary is eliminated. By further limiting the current flow through the electromagnetic coils 112, the total energy stored within each electromagnetic coil is significantly reduced so that the reverse operating characteristics can be improved. Furthermore, by limiting the maximum current flow through the electromagnetic coils 112, the need for a series resistance of comparatively high resistive value as a power dissipating element is eliminated and the overall characteristics of the system may be improved.

Referring now to FIG. 2, a graph of current level within the electromagnetic coils 112 is illustrated. The current level $I_{C1}$ represents the maximum current level allowed to exist within the electromagnetic coils 112. This value is reached when first comparator 114 and first switch 106 become dominant. Thereafter, the current level will decrease to the value $I_{C2}$ as the voltage at circuit location 120, and hence $V_r$ as a result of feedback connection 124, drops from the $V_2$ level. The $I_{C2}$ level is selected to be slightly in excess of $I_H$, the current level required to maintain the electromagnetic coils 112 suitably energized. The time denoted as $T_o$ corresponds to the time when current flow through the electromagnetic coils 112 is sufficient to produce the result for which the electromagnetic coils 112 are intended. By way of example, this would correspond to the actuation of injector valve means in an electrical fuel control system such as is illustrated in U.S. Pat. No. 2,980,090 "Fuel Injection System" by R. W. Sutton et al.

Figure 3:
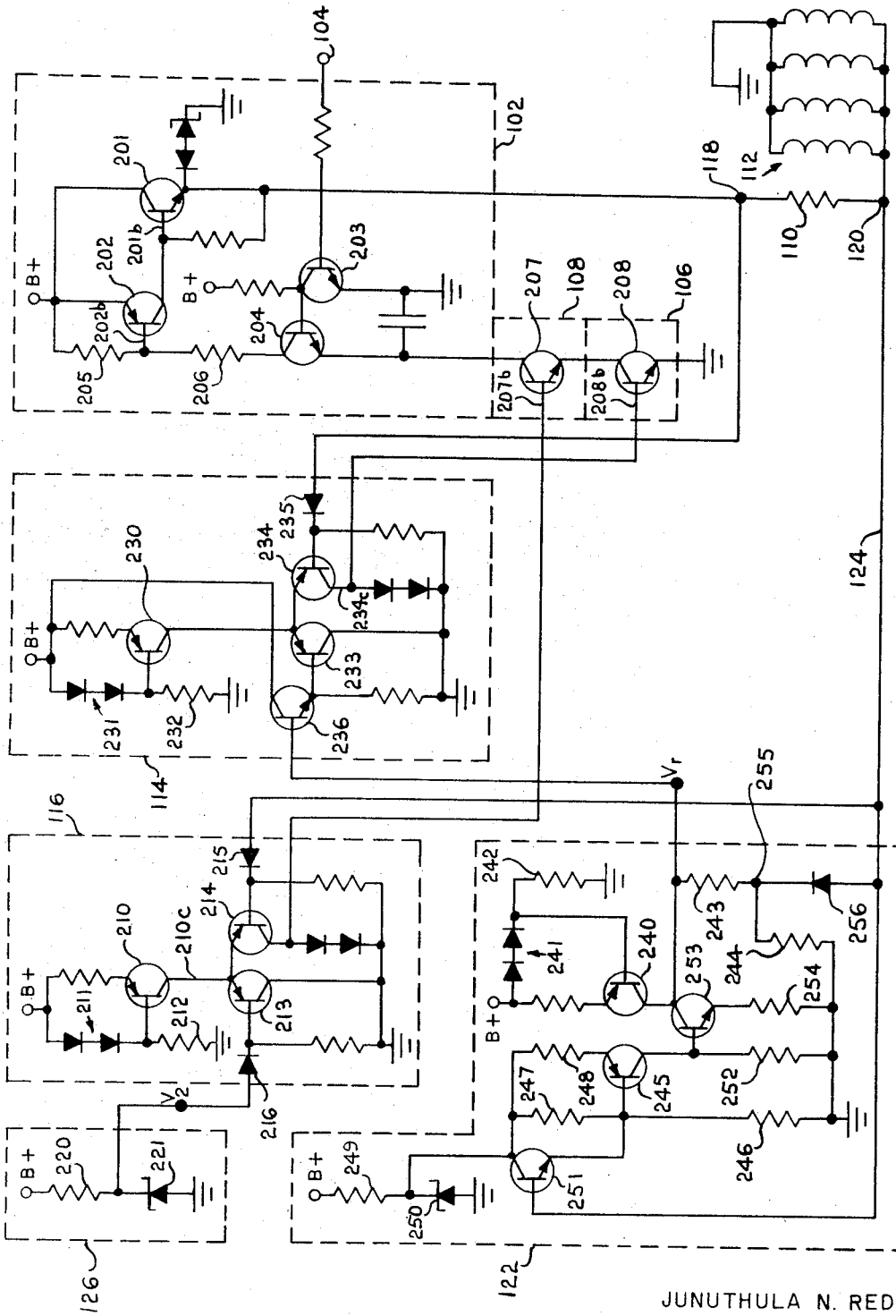
FIG. 3 shows, in diagrammatic circuit form, the electromagnetic coil control circuit having a voltage signal generator according to one embodiment of the present invention.

Referring now to FIG. 3, a circuit diagram is shown in which the various logic diagram blocks from the FIG. 1 representation are illustrated with their electrical circuit components. A preferred embodiment of the present invention is illustrated as it would interrelate and interconnect to an electrical circuit according to FIG. 1.

Power stage 102 is comprised of a power transistor 201 which is controlled by a control transistor 202. Power transistor 201 is in a state of conduction whenever it receives appropriate signals from control transistor 202 and the amount of conduction of transistor 201 is determined by the particular value of current flowing to the base 201b from transistor 202. This value in turn is determined by the particular value of current flowing out of the base 202b of transistor 202. Power stage 102 further includes input transistors 203 and 204. Whenever an input signal is received at input port 104, the transistor 203 will turn "off" and will thereby apply a B+ signal to the base of transistor 204 thereby turning transistor 204 "on." Assuming that switches 106 and 108 are fully closed (i.e., conducting), current will flow through the emitter-base junction of transistor 202 and resistor 206, establishing the current flowing through the base 201b. As will become clear from the discussion hereinbelow, varying the condition (of conduction) of switches 106 and 108 will have the effect of varying the current flowing through base 202b and will hence influence the current flowing into base 201b. This will have the net effect of regulating the power provided through resistor 110 to the electromagnetic coils 112.

Switches 108 and 106 are comprised of transistors 207 and 208 respectively. Transistors 207 and 208 are coupled together with transistor 204 in an emitter-to-collector relationship such that transistors 204, 207 and 208 are in a continuous series relationship and varying the currents flowing into the control electrodes, bases 207b and 208b, of transistors 207 and 208 will have the effect of varying the state of conductance of transistors 207 and 208. Transistors 207 and 208 will thus operate as variable impedances to vary the current flowing through the base 202b of transistor 202.

Second comparator 116 is comprised of a constant current source which includes transistor 210, diode means 211 and resistance 212 going to ground. The constant current source is operative to produce an output current of constant value flowing out of the collector 210c of transistor 210. The collector 210c is connected to the emitters of an emitter-coupled pair of transistors 213, 214. As is the nature of such emitter-coupled pair configurations, the transistor whose base is at the lowest potential with respect to ground will be conducting. The base of transistor 214 is connected, through diode 215, to circuit location 120. When there is no current flowing through circuit location 120, the base of transistor 214 will be substantially at the ground potential, and thus transistor 214 will normally be conducting. The collector of this transistor is connected to the base 207b of switch 108. When the full current being produced by the current source in second comparator 116 is flowing through collector 214c, this will establish a maximum current flow through base 207b and transistor 207 will be in a condition suitable for full conduction. The base of transistor 213 is connected, through diode 216, to voltage regulator 126. This voltage regulator is comprised of a resistor 220 connected between the voltage supply B+ and a zener diode 221. The zener diode is arranged so that its cathode is at a fixed positive voltage intermediate ground and the B+ supply and this fixed voltage establishes the reference voltage $V_2$.

When current begins to flow through the electromagnetic coils 112, the potential at circuit location 120 will rise. As soon as it reaches the level of the reference voltage, $V_2$, Transistor 214 will begin to turn off and transistor 213 will begin to turn on. This action will be communicated to base 207b and transistor 207 will begin to open circuit thereby limiting further voltage increase at circuit location 120. The overall effect of this action will be to regulate the voltage at circuit location 120 to be substantially equivalent to the established reference voltage, $V_2$.

First comparator 114 is similarly comprised of a constant current source feeding current into an emitter-coupled pair of transistors. The current source in this instance comprises transistor 230, diode means 231 and resistor 232 going to ground. The emitter-coupled pair of transistors 233 and 234 operate in much the same manner as the emitter-coupled pair of transistors 213 and 214 of the second comparator 116. Transistor 234 is connected through diode 235 to circuit location 118 and is operative to monitor or sample the voltage appearing thereat. The base of transistor 233 is coupled to the emitter of transistor 236 so that transistor 236 is operative to control the voltage appearing at the base of transistor 233. This voltage is derived from the voltage generator 122 of the present invention. The collector 234c of transistor 234 is connected to base 208b and is operative to control the conductive state thereof. Again, the mechanism of this control and regulation is similar to that previously described with reference to collector 214c of transistor 214 and transistor 207. First comparator 114 is thereby operative to control transistor 208 so that the voltage appearing at circuit location 118 will be substantially equivalent to the voltage applied to the base of transistor 236.

As hereinbefore stated, the voltage being applied to the base of transistor 236 is derived from voltage generator 122. Voltage generator 122 comprises a constant current source which includes transistor 240, diode means 241 and resistor 242. The current generated by the constant current source which includes transistor 240 flows to ground through a resistive network which includes resistors 243 and 244 as well as flowing through transistor 253. The reference voltage output signal, $V_r$, is taken from the collector of transistor 240 which corresponds to the voltage dropped across resistors 243 and 244. A second current source which includes transistor 245 and resistors 246, 247 and 248 is also included within voltage generator 122. The voltage being applied to resistors 247 and 248 is derived from a constant voltage source which includes resistor 249 and zener diode 250. As will be apparent to the man of ordinary skill in the art, this particular voltage reference will also be derived directly from the $V_2$ reference previously discussed or from any other convenient source of constant voltage.

Voltage generator 122 further includes feedback transistor 251 connected with its emitter going to the base of transistor 245, its collector going to the cathode of zener diode 250, and its base connected through circuit lead 124 back to circuit location 120. The output current generated by the current source which includes transistor 245 will flow through resistor 252 to ground. This will establish a voltage to be applied to the base of the control transistor 253. The collector of transistor 253 is as hereinbefore stated connected to the collector of transistor 240 and therefore is also at the $V_r$ reference level voltage. Depending upon the voltage being generated by the variable output current of transistor 245, as this current flows through resistor 252, transistor 253 will be in varying states of conduction. The amount of current flowing through control transistor 253 will be a function of its conductivity and will be drawn from the constant current source which includes transistor 240. Thus, the amount of current flow-ing through resistance 243 will be the current produced by the constant current source which includes transistor 240, reduced by the current flowing through control transistor 253. Circuit location 255, which is the junction between resistors 243 and 244, is connected by diode 256 to circuit lead 124 which as hereinbefore stated is connected to circuit location 120. Thus, the voltage at circuit location 255 will be controlled directly as a function of the voltage at circuit location 120. Therefore, the $V_r$ output voltage signal level will be the value appearing at circuit location 120 increased by the amount of current flowing through resistor 243 times the resistive value thereof.

With circuit location 120 residing at the $V_2$ regulated value, the level of $V_r$ will be established at an initial value. This will be determined by the conductivity of transistor 253 which is controlled indirectly by the conductivity of transistor 251, and by the intercoupling of circuit lead 124 with circuit point 255 by diode 256. When the voltage at circuit location 118 reaches the initial level of output voltage, $V_r$, the emitter-coupled pair of transistors 233, 234 will begin to switch and to thereby regulate the conductivity of transistor 208. This initial step of regulation will have the effect of limiting the growth of voltage at circuit location 118. As a result, the potential at the circuit location 120 will begin to drop. This automatically regulated drop will be communicated through circuit lead 124 and diode 256, to circuit location 255. Thus, the portion of the output voltage signal $V_r$ which is controlled by the voltage at circuit location 255 will begin to decrease. Additionally, the decreasing voltage at circuit location 120 will be communicated back to the base of transistor 251 where the conductivity thereof will be altered. This altered conductivity will alter the current being generated by the variable current source which includes transistor 245 and this variation in output current will thereby control the conductivity of transistor 253 so that the portion of the level of output signal $V_r$ which is controlled by the conductivity of transistor 253 will also be altered. This combined variation will establish the second, lower, value of $V_r$ and the regulation of transistor 208 accomplished by the emitter-coupled pair of transistors 233 and 234 will thereby be altered to maintain circuit location 118 at the newly established $V_r$ level.

By combining the constant and variable current sources as described hereinabove, to control the voltage drop across a selected resistor, the main objects of the present invention are achieved. A simple, economical, nontransient producing variable output voltage generator is provided. Furthermore, by interconnecting the remotely sensed voltage at circuit location 120 to one side of the selected resistor an automatic and failure free reduction in the output voltage signal is achieved freeing the voltage generator from the total failures possible if either of the control transistors or the variable current source should fail.

I claim:

1. A circuit for generating an output voltage signal having a plurality of signal levels and switchable therebetween in response to variations in a remote sensed voltage comprising:

first current generating means operative to generate a first current having a predeterminable level;

at least two series coupled resistances connected to said generating means operative to dissipate the electrical energy of said first current;

feedback voltage means interconnecting said resistances and the remote sensed voltage operative to establish a voltage level across at least one of the resistances; and output means connected to the resistances at a location removed from the feedback voltage means by at least one resistance whereby the output signal will differ from the remote sensed voltage by the value of current flowing through the interconnecting resistance multiplied by the resistive value thereof and will automatically follow variations in the remote sensed voltage.

2. The circuit as claimed in claim 1 including further uni-directional current flow means in said feedback voltage means to isolate the remote sensed voltage from the series coupled resistances.

3. The circuit as claimed in claim 1 including further regulatable means coupled to said plurality of resistances in an electrically parallel relationship with said resistances operative to variably divert predeterminable amounts of said first current to thereby vary the output signal level; and control means intercommunicating said regulatable means and said feedback voltage means operative to regulate said regulatable means in response to the remote sensed voltage.

4. The circuit as claimed in claim 3 wherein said regulatable means comprise a controllable current sink having a control electrode and said control means include a second current source operative to generate a variable current, said second current source connected to said current sink control electrode to regulate said current sink in accord with the remote sensed voltage.

* * * * *